Figure 1:
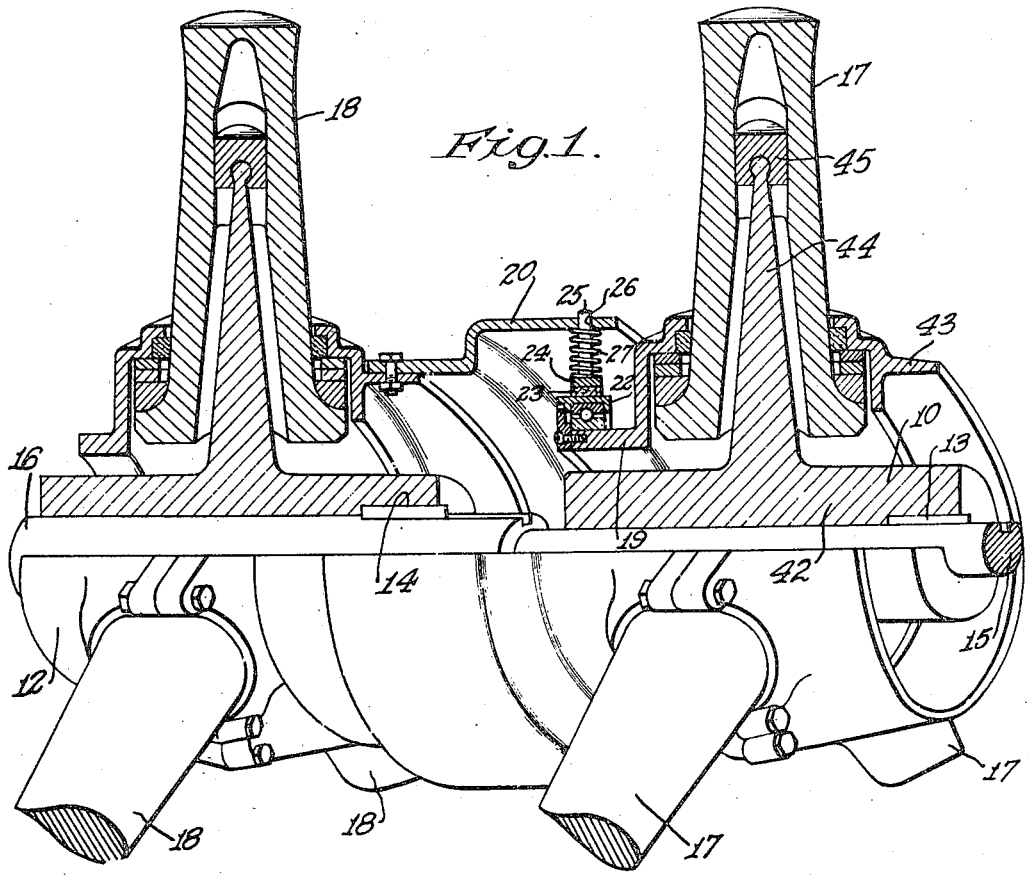

March 15, 1949.  C. M. KEARNS, JR  2,464,773
DUAL ROTATION PROPELLER WITH A DAMPED FLEXIBLE
AXIAL COUPLING BETWEEN THE TWO HUBS
Filed Sept. 21, 1945

INVENTOR.
CHARLES M. KEARNS JR.
BY Ernest D. Given
ATTORNEY

Patented Mar. 15, 1949

2,464,773

UNITED STATES PATENT OFFICE 2,464,773

DUAL ROTATION PROPELLER WITH A DAMPED FLEXIBLE AXIAL COUPLING BETWEEN THE TWO HUBS

Charles M. Kearns, Jr., Manchester, Conn., assignor to United Aircraft Corporation, East Hartford, Conn., a corporation of Delaware Application September 21, 1945, Serial No. 617,717

6 Claims. (Cl. 170—135.28)

This invention relates to dual rotation aircraft propellers, in which sets of propeller blades are mounted on oppositely rotating coaxial hubs, and it has for its object to minimize or suppress deleterious vibrations which are commonly transmitted between the hubs of such propellers.

Another object of the invention is to control the vibrations of oppositely rotating propellers of the foregoing type by mechanically absorbing vibratory energy from the relative vibrations of the several propeller hubs.

Various other objects and advantages will be apparent as the nature of the invention is more fully disclosed.

In the embodiment of the invention disclosed herein for the purposes of illustration, flexible members are interposed between the hubs of the dual rotation propellers. In carrying out the invention, damping means such as brake shoes are interposed between the coaxial propeller hubs to dissipate vibratory energy, and bearings are provided between the hubs so that relative rotation of the hubs is possible but all other relative motions are effectively damped by the damping means.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

Figure 2:
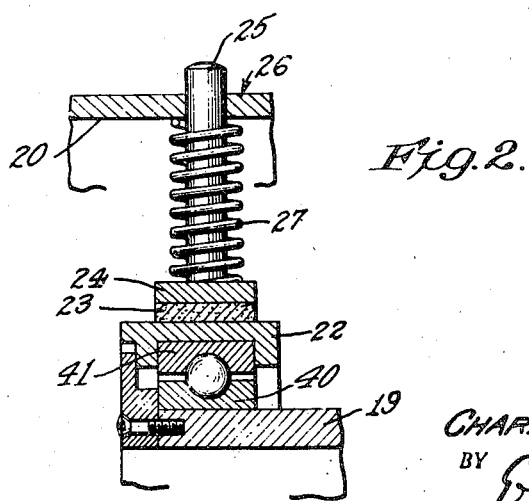

In the drawing:

Figure 1 is a sectional perspective view of a dual rotation aircraft propeller embodying the present invention; and Fig. 2 is a sectional view, on an enlarged scale, through the damping means of Fig. 1.

In the following description certain specific terms are used for convenience in referring to the various details of the invention. These terms, however, are to be interpreted as broadly as the state of the art will permit.

The propeller shown in Fig. 1 comprises a pair of axially aligned hubs 10 and 12 which are keyed at 13 and 14, respectively, to oppositely rotatable propeller shafts 15 and 16, in a manner well understood in the art. In the embodiment illustrated, the hubs 10 and 12 carry three propeller blades 17 and 18, respectively.

The adjacent ends of the propeller hubs 10 and 12 have concentric annular walls or flanges 19 and 20, respectively, which telescope one within the other.

An annular anti-friction bearing including a pair of relatively rotatable bearing members, shown as an inner race 40 and an outer race 41 each provided with a reentrant groove for the reception of intermediate balls, is mounted on the flange 19 of the hub 10. Upon the outer race or bearing member 41 is mounted a ring member 22, as best shown in Fig. 2. The type of bearing construction provided serves in practice to prevent relative axial movement of the bearing members 40 and 41, so that the ring member 22 will partake of any axial movement of flange 19. The inner bearing member or race 40 of the bearing assembly is secured in any suitable manner to flange 19.

Damping shoes 23 of any suitable material are bonded to arcuate plates 24 carried by pins or lugs 25 which are loosely seated in holes 26 in the annular flange 20 of hub 12, and springs 27 compressed between the flange 20 and plates 24 resiliently urge the damping shoes 23 into frictional engagement with the outer surface of ring member 22 on flange 19 of hub 10. While the outer race 41 is shown separate from the ring member 22, these members may broadly be considered as one and generally designated as the outer bearing raceway. The damping shoe units are spaced about the circumference of the hubs and are preferably at least three or four in number.

The resilient means here shown as springs 27 constantly urge the damping shoes 23 against ring member 22 regardless of the relative motions of the respective hubs 10 and 12. The bearing 22 permits relative rotation of the hubs 10 and 12, but all other relative motions of the hubs are effectively damped by the energy dissipating brake shoes.

While the novel means forming the subject matter of this invention may be applied advantageously to various different types of propeller hub constructions as hereinabove generally set forth, it is illustrated particularly in conjunction with a type of construction such as is shown and described in detail in the patents to Martin, No. 2,144,428, granted January 17, 1939, and Tyler, No. 2,112,797, granted March 29, 1938, both of which are owned in common with the present application.

In accordance with the constructions disclosed in these patents, and referring now to the present drawings, each of the hubs 10 and 12 is formed with an inner hub part 42, which is secured to the respective shaft 15 or 16 as hereinabove set forth, and an outer hub part 43 spaced from the inner hub part as shown. The sole connection between these two hub parts is through radially outwardly extending arms as shown at 44, respectively associated with each of the propeller blades and having a connection generally indicated at 45 with the associated blades respectively at points spaced a substantial distance outwardly from the roots of such blades.

When using such a construction the outer hub part 43 may be said to have a floating connection in respect to the inner hub part as set forth in detail in the Martin and Tyler patents aforesaid. The application of the specific vibration damping means described hereinabove and shown in the accompanying drawings to this type of propeller hub construction is to be considered a part of the present invention.

Although a specific embodiment has been shown and described herein for purposes of illustration, it will be evident to those skilled in the art that the invention is capable of various modifications and adaptations within the scope of the appended claims.

What is claimed is:

1. A dual rotation aircraft propeller, comprising a pair of axially aligned hubs adjacent to one another and rotatable in opposite directions, a plurality of propeller blades carried by each of said hubs, concentric annular flanges on the adjacent ends of said hubs respectively, an annular anti-friction bearing including a pair of raceways separated by rotatable means and having one of said raceways secured to one of said annular flanges, means for preventing relative axial movement of said raceways and damping means mounted on the other of said flanges and frictionally engaging the other of said raceways of said bearing.

2. A dual rotation aircraft propeller, comprising a pair of axially aligned hubs adjacent to one another and rotatable in opposite directions, a plurality of propeller blades carried by each of said hubs, concentric annular flanges on the adjacent ends of said hubs respectively, an annular anti-friction bearing including a pair of raceways separated by rotatable means and having one of said raceways secured to one of said annular flanges, means for preventing relative axial movement of said raceways, a plurality of brake shoes mounted on the other of said flanges, and means resiliently urging said brake shoes into frictional engagement with the other of said raceways of said bearing.

3. A dual rotation aircraft propeller, comprising a pair of axially aligned hubs adjacent to one another and rotatable in opposite directions, a plurality of propeller blades carried by each of said hubs, concentric annular flanges on the adjacent ends of said hubs respectively, an annular anti-friction bearing including a pair of raceways separated by rotatable means and having one of said raceways secured to one of said annular flanges, means for preventing relative axial movement of said raceways, and an annular series of damping means mounted on the other of said flanges and frictionally engaging the other of said raceways of said bearing, each of said damping means comprising an arcuate brake shoe having a facing of friction brake material, at least one stem secured to said brake shoe and passing through the flange with which said damping means is associated, and at least one compression spring extending between the last named flange and said brake shoe for urging the friction brake material carried thereby into engagement with the second named raceway of said bearing.

4. A dual rotation aircraft propeller, comprising a pair of similar axially aligned hubs adjacent to one another and rotatable in opposite directions, a plurality of propeller blades carried by each of said hubs, each of said hubs including an inner part arranged to be secured on and driven by a central shaft and an outer part spaced radially therefrom, and radially extending arms upon said inner part arranged concentric with said blades respectively and connected to drive said outer part by connections to said arms within and spaced from the roots of said respective blades, concentric annular flanges on the adjacent ends of the outer parts of said hubs respectively, an annular anti-friction bearing including a pair of raceways separated by rotatable means and having one of said raceways secured to one of said annular flanges, means for preventing relative axial movement of said raceways and damping means mounted on the other of said flanges and frictionally engaging the other of said raceways of said bearing.

5. A dual rotation aircraft propeller, comprising a pair of similar axially aligned hubs adjacent to one another and rotatable in opposite directions, a plurality of propeller blades carried by each of said hubs, each of said hubs including an inner part arranged to be secured on and driven by a central shaft and an outer part spaced radially therefrom, and radially extending arms upon said inner part arranged concentric with said blades respectively and connected to drive said outer part by connections to said arms within and spaced from the roots of said respective blades, concentric annular flanges on the adjacent ends of the outer parts of said hubs respectively, an annular anti-friction bearing including a pair of raceways separated by rotatable means and having one of said raceways secured to one of said annular flanges, means for preventing relative axial movement of said raceways and an annular series of damping means mounted on the other of said flanges and frictionally engaging the other of said raceways of said bearing, each of said damping means comprising an arcuate brake shoe having a facing of friction brake material, at least one stem secured to said brake shoe and passing through the flange with which said damping means is associated, and at least one compression spring extending between the last named flange and said brake shoe for urging the friction brake material carried thereby into engagement with the second named raceway of said bearing.

6. A dual-rotation aircraft propeller, comprising a pair of axially aligned hubs adjacent to one another and rotatable in opposite directions, a plurality of propeller blades carried by each of said hubs, a pair of relatively rotatable bearing members, means for preventing relative axial movement of said bearing members, means for securing one of said bearing members to one of said hubs, and damping means carried by the other of said hubs and frictionally engaging the other of said bearing members for damping relative vibratory movement of said hubs.

CHARLES M. KEARNS, Jr.

REFERENCES CITED

The following references are of record in the file of this patent:

UNITED STATES PATENTS

| Number | Name | Date |
|---|---|---|
| 1,162,125 | Bassett | Nov. 30, 1915 |
| 1,510,303 | Bugatti | Sept. 30, 1924 |
| 2,283,839 | Wright | May 19, 1942 |

FOREIGN PATENTS

| Number | Country | Date |
|---|---|---|
| 468,338 | Great Britain | July 2, 1937 |
| 546,291 | Great Britain | July 6, 1942 |
| 583,118 | France | Jan. 7, 1925 |